(12) United States Patent
Fukawatase et al.

(10) Patent No.: US 7,988,184 B2
(45) Date of Patent: Aug. 2, 2011

(54) FRONT PASSENGER AIRBAG DEVICE

(75) Inventors: Osamu Fukawatase, Nishikamo-gun (JP); Muneo Akashio, Aichi-ken (JP); Tomotaka Kuroda, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/620,159

(22) Filed: Nov. 17, 2009

(65) Prior Publication Data

US 2010/0123299 A1    May 20, 2010

(30) Foreign Application Priority Data

Nov. 18, 2008    (JP) ................................ 2008-294044

(51) Int. Cl.
*B60R 21/20*  (2011.01)
(52) U.S. Cl. ................................................... 280/728.3
(58) Field of Classification Search .............. 280/728.3, 280/729, 732, 740, 742
See application file for complete search history.

(56) References Cited

U.S. PATENT DOCUMENTS

| | | | | | |
|---|---|---|---|---|---|
| 5,082,310 | A | * | 1/1992 | Bauer | 280/732 |
| 5,342,088 | A | * | 8/1994 | Bauer | 280/728.3 |
| 5,573,270 | A | * | 11/1996 | Sogi et al. | 280/740 |
| 7,530,597 | B2 | * | 5/2009 | Bito | 280/742 |
| 2004/0160043 | A1 | * | 8/2004 | Litjens et al. | 280/732 |
| 2007/0145730 | A1 | * | 6/2007 | Choi | 280/740 |
| 2007/0262570 | A1 | * | 11/2007 | Choi | 280/729 |

FOREIGN PATENT DOCUMENTS

| | | |
|---|---|---|
| JP | 01110251 A | 4/1989 |
| JP | 10071906 A | 3/1998 |
| JP | 2000079862 A | 3/2000 |
| JP | 2001180417 A | 7/2001 |
| JP | 2003182496 A | 7/2003 |
| JP | 2005153593 A | 6/2005 |
| JP | 2005212695 A | 8/2005 |
| JP | 2006021703 A | 1/2006 |
| JP | 2006062420 A | 3/2006 |

* cited by examiner

*Primary Examiner* — Paul N Dickson
*Assistant Examiner* — Robert A Coker
(74) *Attorney, Agent, or Firm* — Gifford, Krass, Sprinkle, Anderson & Citkowski, P.C.

(57) ABSTRACT

A front passenger airbag device includes an airbag that deploys toward a front seat passenger, and an airbag door provided in a dashboard. The airbag door includes a central door that opens in a vehicle longitudinal direction, and lateral end doors that are provided on the lateral sides of the central door to open in the vehicle width direction due to the inflation pressure of the airbag. The inflation pressure of the airbag acts on the respective lateral end doors almost exclusively during the initial stage of the airbag deployment.

14 Claims, 15 Drawing Sheets

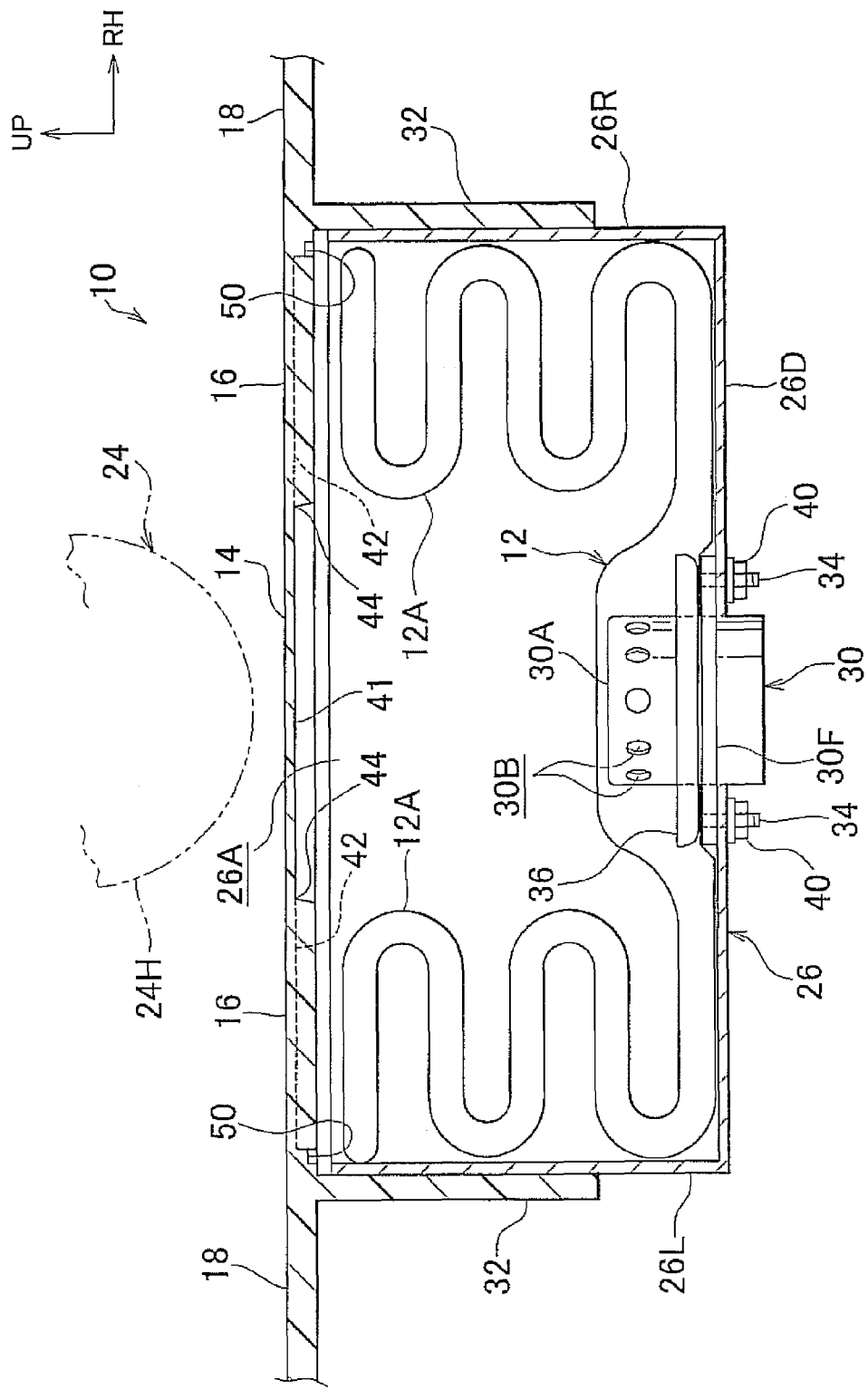

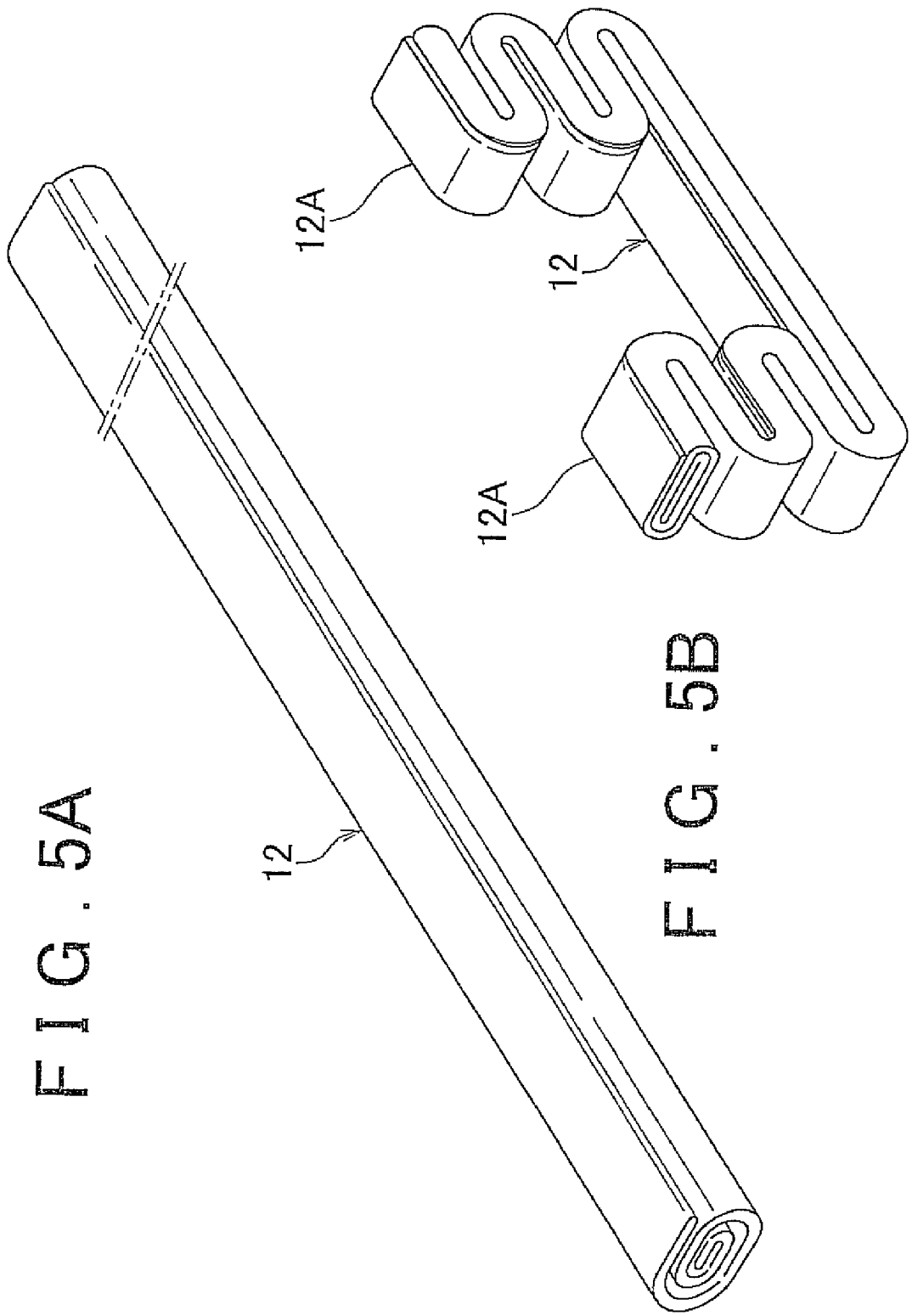

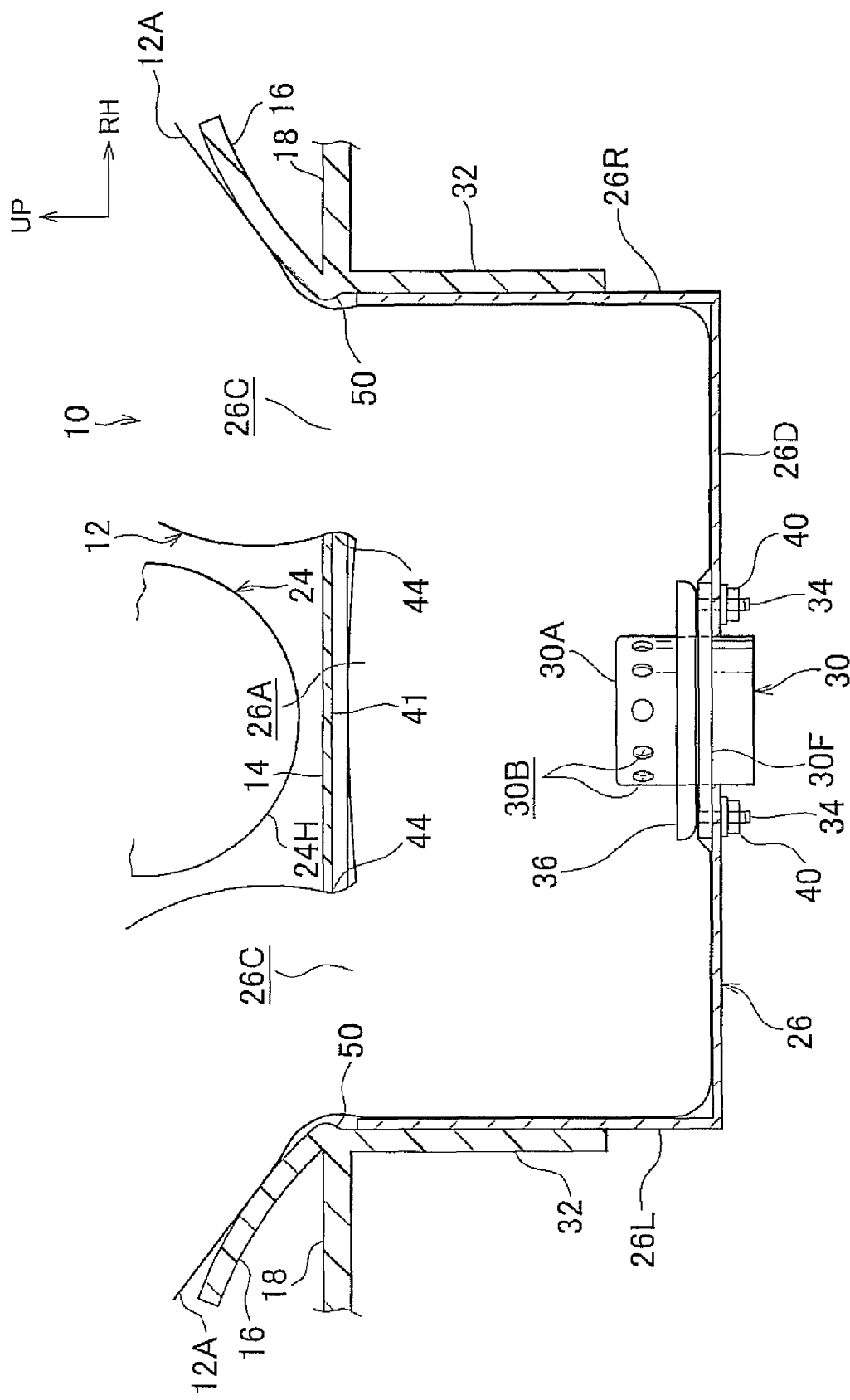

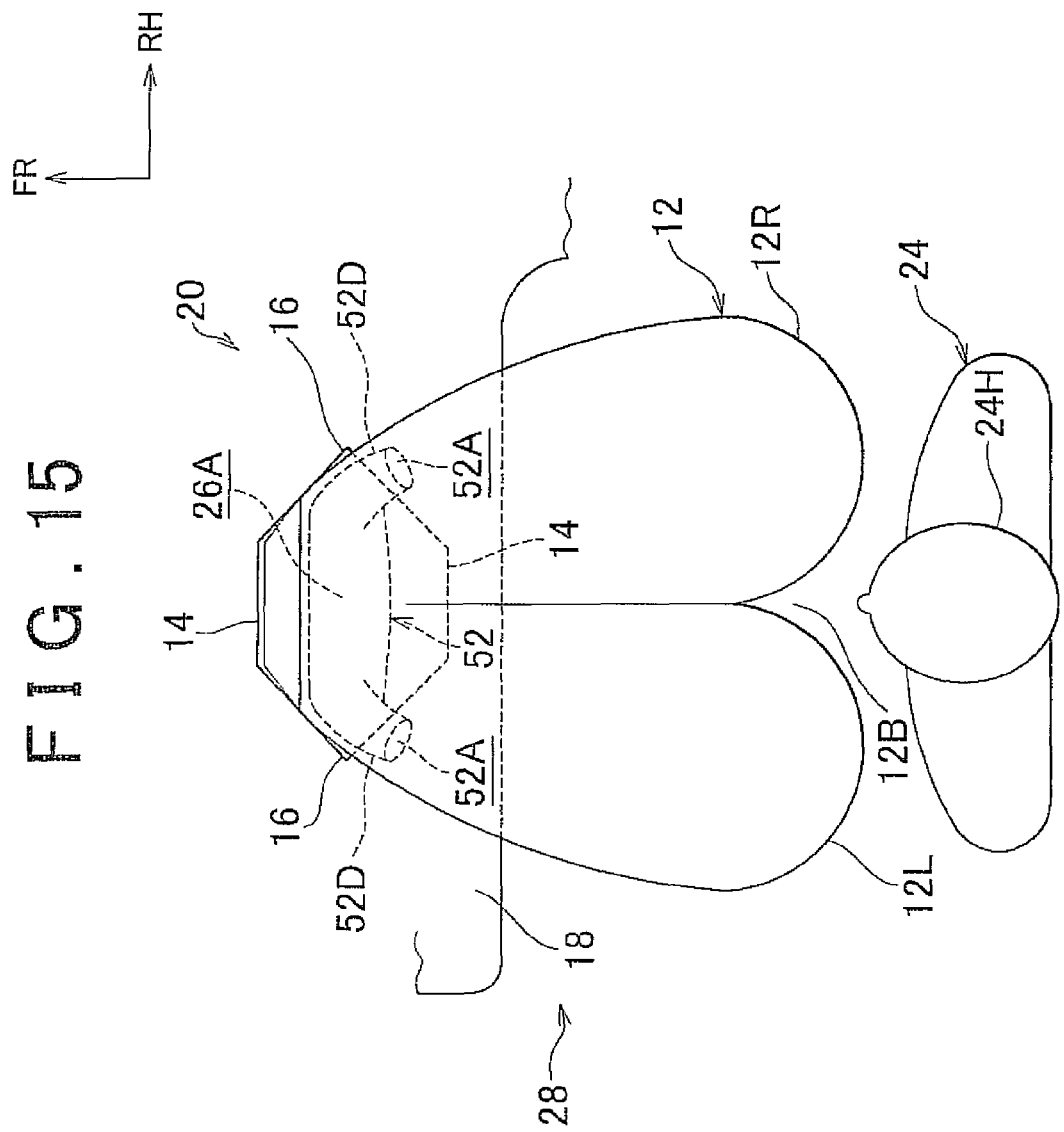

FRONT PASSENGER AIRBAG DEVICE

INCORPORATION BY REFERENCE

The disclosure of Japanese Patent Application No. 2008-294044 filed on Nov. 18, 2008 including the specification, drawings and abstract is incorporated herein by reference in its entirety.

BACKGROUND OF THE INVENTION

1. Field of the Invention

The invention relates to a front passenger airbag device.

2. Description of the Related Art

An airbag door having four door panels that are separated from one another through the rupture of prearranged rupture portions extended in the shape of a combination of two letters "Y", and provided with a regulation portion that is contiguous to a corner of an airbag passage port to regulate the direction of expansion of an airbag is described in Japanese Patent Application Publication No. 2006-62420 (JP-A-2006-62420).

The seating position of a passenger in a front passenger seat changes depending on the build of the passenger and the longitudinal position of the front passenger seat. It could be that sometimes the seating position of the passenger is sufficiently distant from a dashboard in which an airbag is accommodated or sometimes the seating position of the passenger is near a dashboard in which an airbag is accommodated.

However, in the related art, the seating position of the passenger is not considered at all. In particular, there is still room for improvement in reduction of the reactive force of the airbag for the passenger when the passenger sits near the dashboard when being restrained by the expanded/deployed airbag.

SUMMARY OF THE INVENTION

The invention provides a front passenger airbag device that appropriately restrains a passenger in the front passenger seat by means of an airbag even if the passenger is near the dashboard.

A front passenger airbag device according to one aspect of the invention includes an airbag and an airbag door. The airbag is folded and accommodated in an accommodation portion provided in a dashboard in front of a front seat passenger to deploy toward the front-seat passenger when inflated with a gas if a head-on collision of a vehicle occurs. The airbag door is provided in the dashboard and opens when the airbag is deployed toward the front-seat passenger. In the front passenger airbag device, the airbag door includes a central door that is provided at a central portion of the airbag door, and opens in the vehicle longitudinal direction when the airbag is deployed. The airbag door also includes lateral end doors that are provided adjacent to both sides of the central door, and that open in the vehicle width direction due to the inflation pressure of the airbag. The inflation pressure of the airbag acts on the lateral end doors during an initial stage of an inflation of the airbag.

In the front passenger airbag device according to the foregoing aspect of the invention, the airbag, which is folded and accommodated in the accommodation portion provided in the dashboard in front of the front passenger seat, deploys toward the front passenger seat when inflated with the gas.

It should be noted that the central door, which opens due to the inflation pressure of the airbag, is provided at the central portion of the airbag door in the vehicle width direction, and that the lateral end doors, which open in the vehicle width direction due to the inflation pressure of the airbag, are provided adjacent to both the sides of the central door in the vehicle width direction. In the initial stage of the inflation of the airbag, the inflation pressure of the airbag acts on the lateral end doors. Therefore, the lateral end doors open before the central door opens, and initial inflation ports open both the sides in the vehicle width direction respectively. The airbag begins to expand from within the accommodation portion outward in the vehicle width direction through the initial inflation ports.

As described above, the area corresponding to the central door is suppressed from opening during the initial stages of inflation of the airbag. Thus, even when the passenger in the front passenger seat is near the dashboard when a head-on collision of the vehicle occurs, the reactive force of the airbag for the passenger, in the initial stage of the inflation of the airbag, can be suppressed, and the airbag can restrain the passenger appropriately.

Further, when the airbag further expands, the inflation pressure of the airbag acts on the central door as well, the central door opens, and the inflation opening fully opens. Therefore, the airbag can deploy into its original size. Thus, if the front seat passenger is sufficiently distant from the dashboard and is not near the dashboard when a head-on collision of the vehicle occurs, a sufficient reactive force of the airbag to appropriately restrain the front seat passenger is ensured.

Further, in the front passenger airbag device according to the foregoing aspect of the invention, both lateral ends, in the vehicle width direction, of the airbag may be folded in the vehicle width direction after being folded in the vehicle longitudinal direction. Both the ends of the airbag in the vehicle width direction may be arranged to face the lateral end doors respectively.

In the front passenger airbag device according to the foregoing aspect of the invention, both the lateral ends of the airbag is folded in the vehicle width direction after being folded in the vehicle longitudinal direction. Therefore, when the airbag is supplied with the gas, both the lateral ends of the airbag first begin to inflate in the vehicle width direction. Both the lateral ends of the airbag are arranged to face the lateral end doors respectively. Therefore, the inflation pressure of the airbag in the initial stage of the inflation acts in a concentrated manner on the lateral end doors. Thus, the lateral end doors open before the central door opens, and the initial inflation ports are formed on both the sides in the vehicle width direction respectively. The airbag begins to inflate within the accommodation portion outward in the vehicle width direction through the initial inflation ports. Thus, the airbag located at the area corresponding to the central door can be suppressed from inflating in the initial stage of the inflation of the airbag. As a result, even if the front seat passenger is near the dashboard, the reactive force of the airbag for the passenger can be suppressed, and the airbag can restrain the passenger appropriately.

Further, in the front passenger airbag device according to the foregoing aspect of the invention, an inner bag, provided within the airbag, that distributes the gas to both the sides of the airbag in the vehicle width direction.

In the front passenger airbag device according to the foregoing aspect of the invention, the inner bag, provided within the airbag, that distributes the gas to both the sides of the airbag in the vehicle width direction. Therefore, the gas supplied into the airbag is distributed to both the sides in the vehicle width direction by the inner bag in the initial stage of the inflation of the airbag. Thus, the inflation pressure of the airbag acts on the lateral end doors located on both the sides of the inflation opening of the airbag in the vehicle width direction respectively. Therefore, the lateral end doors open before the central door opens, and the initial inflation ports are formed on both the sides of the airbag door in the vehicle width direction. The airbag begins to inflate from inside the accommodation portion outward in the vehicle width direction through the initial inflation ports. Thus, the airbag located at the area corresponding to the central door can be suppressed from deploying in the initial stage of the inflation of the airbag. Accordingly, even if the front seat passenger is near the dashboard, the reactive force of the airbag for the passenger can be suppressed in the initial stage of the inflation, and the airbag can restrain the passenger appropriately.

Further, in the front passenger airbag device according to the foregoing aspect of the invention, the central door may be formed as a pair of central doors that open forward and backward with respect to the vehicle respectively. A first prearranged rupture portion that ruptures due to the inflation pressure of the airbag may be provided at a border between the central doors. A second prearranged rupture portions that are more fragile than the first prearranged rupture portion and rupture due to the inflation pressure of the airbag may be provided respectively at borders between the central doors and the lateral end doors.

In the front passenger airbag device according to the foregoing aspect of the invention, the central door is formed as the pair of the central doors that open forward and backward with respect to the vehicle respectively, and the second prearranged rupture portions are provided at the borders between the central doors and the lateral end doors and ruptures due to the inflation pressure of the airbag. Therefore, when the inflation pressure of the airbag acts on the lateral end doors in the initial stage of airbag deployment, the second prearranged rupture portions rupture to open the lateral end doors. The second prearranged rupture portions are more fragile than the first prearranged rupture portion and hence are likely to rupture when the inflation pressure of the airbag acts thereon. Thus, during the initial stage of the inflation of the airbag, the central doors can be suppressed from opening to promote the opening of the lateral end doors.

Further, the first prearranged rupture portion is provided at the border between the pair of the central doors and ruptures due to the inflation pressure of the airbag. Therefore, when the airbag further inflates and the inflation pressure thereof acts on the pair of the central doors, the first prearranged rupture portion ruptures. Therefore, the pair of the central doors opens forward and backward with respect to the vehicle, and the inflation opening opens completely. As a result, the airbag can deploy into its original size.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 1 to 9 relate to the first embodiment of the invention, and FIG. 1 is a perspective view of an dashboard of a vehicle equipped with a front passenger seat airbag device as viewed from the interior of the vehicle;

FIG. 2 is a plan view showing the central doors, lateral end doors, a first prearranged rupture portion, and second prearranged rupture portions that are provided in the dashboard;

FIG. 4 is an enlarged sectional view showing the front passenger airbag device as viewed in a direction indicated by arrows 4-4 of FIG. 1;

FIG. 5A is a perspective view showing the airbag when folded in a vehicle longitudinal direction;

FIG. 5B is a perspective view showing the airbag when both lateral ends, in the vehicle width direction, of the airbag are further folded in the vehicle width direction;

FIG. 7 is a sectional view showing a state where the lateral end doors on both the sides of the airbag have opened in the vehicle width direction respectively and both the lateral ends of the airbag have inflated through the initial inflation ports respectively in the initial stages of inflation of the airbag;

FIGS. 10 to 15 relate to the second embodiment of the invention, and FIG. 10 is a sectional view equivalent to FIG. 4, showing a front passenger airbag device;

FIG. 11A is a perspective view showing an airbag when folded in a vehicle longitudinal direction, and an inner bag arranged in a fold state in the airbag;

FIG. 11B is a perspective view showing the airbag when both lateral ends, in the vehicle width direction, of the airbag are further folded in the vehicle width direction;

FIG. 12 is a perspective view showing a deployment state of the inner bag, and the flow of a gas supplied from an inflator into the inner bag;

FIG. 14 is a sectional view showing the lateral end doors on both the sides of the airbag door have opened on both the sides in the vehicle width direction respectively and both the lateral ends of the airbag in the vehicle width direction have inflated through the initial inflation ports respectively in the initial stages of inflation of the airbag; and FIG. 15 is a plan view according to still another modified example of the invention, showing a right expansion portion and a left expansion portion of the airbag when deployed in front of a passenger in the vehicle longitudinal direction.

DETAILED DESCRIPTION OF EMBODIMENTS

The embodiments of the invention will be described hereinafter on the basis of the drawings.

Figure 1:
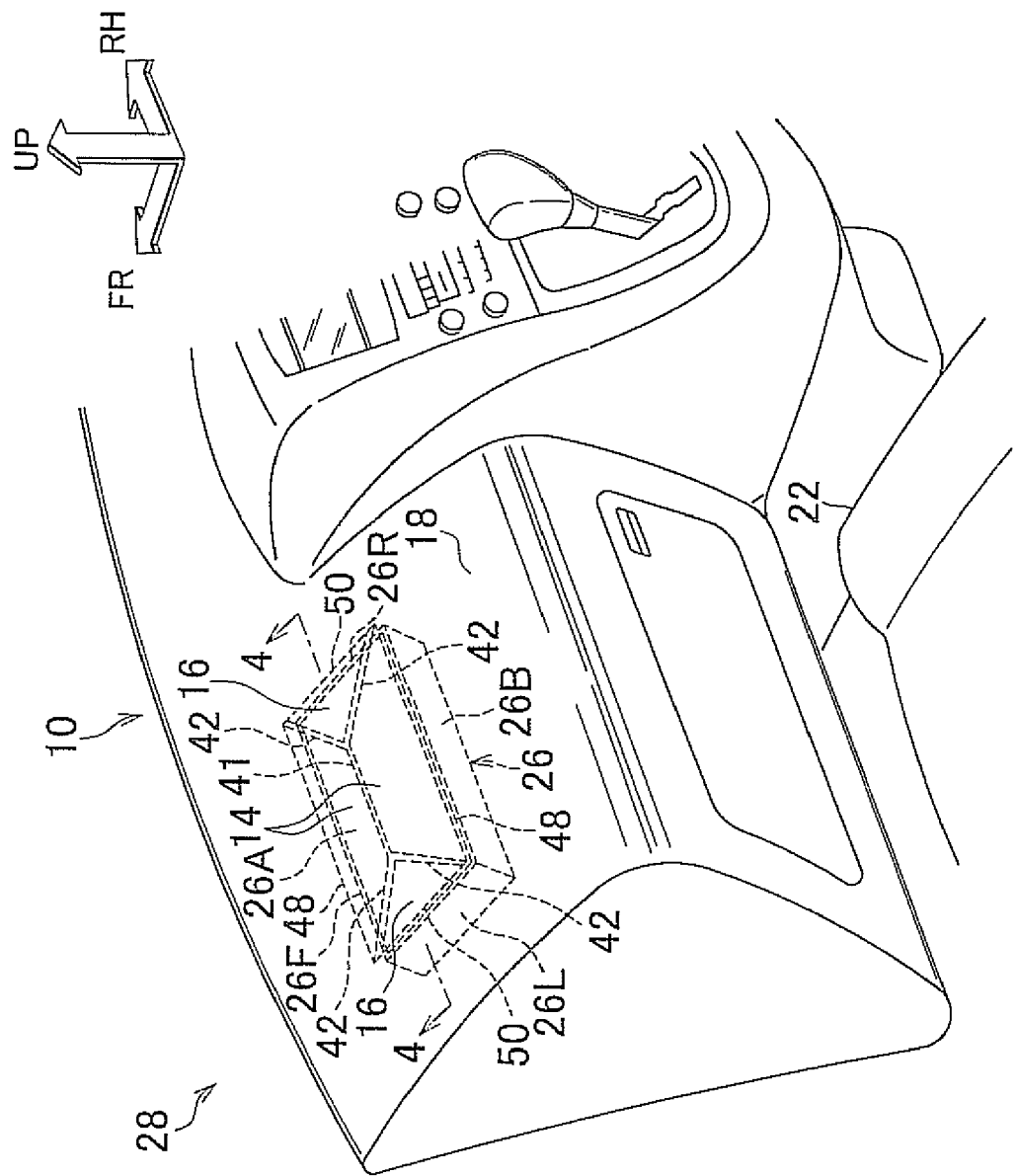

Referring to FIG. 1, an airbag device 10 for a front passenger according to the first embodiment of the invention has an airbag 12, central doors 14, and lateral end doors 16.

Referring to FIG. 4, the airbag 12 is folded and accommodated in a module case 26 (an accommodation portion) provided in the dashboard 18 in front of a passenger 24 seated in a front passenger seat 22. The airbag 12 inflates and is deployed toward the passenger 24 when supplied with a gas from, for example, an inflator 30 when a head-on collision of a vehicle 28 occurs. Further, the airbag 12 is folded at its lateral ends 12A in a vehicle width direction, for example, concertinas as shown in FIG. 5B after being folded in the vehicle longitudinal direction as shown in FIG. 5A. As shown in FIG. 4, both the lateral ends 12A of the airbag 12 face the positions of the lateral end doors 16 respectively. More specifically, both the lateral ends 12A of the airbag 12 are arranged within regions of the lateral airbag doors 16 respectively. Thus, the inflation pressure of the airbag 12 is concentrated at the lateral end doors 16 in the initial stages of inflation of the airbag 12.

The depicted shape into which the airbag 12 of FIG. 4 is folded is merely an example. The airbag 12 may be folded in any suitable manner as long as the inflation pressure of the airbag 12 is concentrated on the lateral end doors 16 in the initial stages of inflation of the airbag 12.

As shown in FIGS. 1 and 4, the module case 26 is a box made of, for example, a metal and having a front longitudinal wall portion 26F, a rear longitudinal wall portion 26B, a lower wall portion 26D, a right longitudinal wall portion 26R, and a left longitudinal wall portion 26L. The module case 26 is arranged on a reverse face side of the dashboard 18 such that an inflation opening 26A of the module case 26 is located at the upper side of the module case 26. The inflation opening 26A serves as the exit for the airbag 12 during inflation of the airbag. During normal state, the inflation opening 26A is closed by, for example, the central doors 14 and the lateral end doors 16, which are formed integrally in the dashboard 18.

As shown in FIG. 4, a retainer 32 to which the module case 26 is mounted is provided on the reverse face of the dashboard 32. The retainer 32 is a frame that surrounds the mounting area of the module case 26. The module case 26 is mounted on the retainer 32 by inserting the module case 26 into the retainer 32.

Although the retainer 32 is provided integrally with the dashboard 18 in the example shown in the drawings, the invention is not limited to this configuration. It is also appropriate to adopt a configuration in which the retainer 32 formed as a separate component from the dashboard 18 and may be firmly fixed to the reverse face of the dashboard 18. In this case, door base members (not shown) equivalent to the central doors 14 and the lateral end doors 16 may be provided along the reverse face of the dashboard 18.

As shown in FIGS. 4 and 7, the inflator 30 is a gas generator assuming the shape of, for example, a disc and designed to injects gas into the airbag 12 when a head-on collision of the vehicle 28 occurs. The upper portion of the inflator 30 serves as a gas injection portion 30A. More specifically, a plurality of gas injection holes 30B is provided, along a circumferential direction of the inflator 30, in an outer peripheral face of the inflator 30. The gas injection portion 30A is arranged inside the airbag 12. In a portion of the inflator 30 located below the gas injection portion 30A, a mounting flange 30F generally in the shape of, for example, a rectangle is provided in the inflator 30. The mounting flange 30F abuts on, for example, the upper face of the lower wall portion 26D of the module case 26.

Further, a retainer 36 generally in the shape of, for example, a rectangular frame is disposed inside the airbag 12. Stud bolts 34 protruding downward are provided at four corners of the retainer 36. The stud bolts 34 are inserted into the mounting flange 30F and the lower wall portion 26D of the module case 26 when the airbag 12 accommodates inside the module case 26. The inserted stud bolts 34 protrude below the lower wall portion 26D of the module case 26. By fastening nuts 40 onto the stud bolts 34 from below the module case 26, the inflator 30 and the airbag 12 are securely fastened to the lower wall portion 26D of the module case 26.

Although not shown in the drawings, the inflator 30 is connected to an airbag ECU via a wire harness, and is configured to be actuated through an actuation current from the airbag ECU and inflates the airbag 12 with the gas. The airbag ECU is configured to cause the actuation current to flow through the inflator 30 upon determining on the basis of a signal from a collision sensor (not shown) when a head-on collision of the vehicle 28 occurs.

Figure 2:
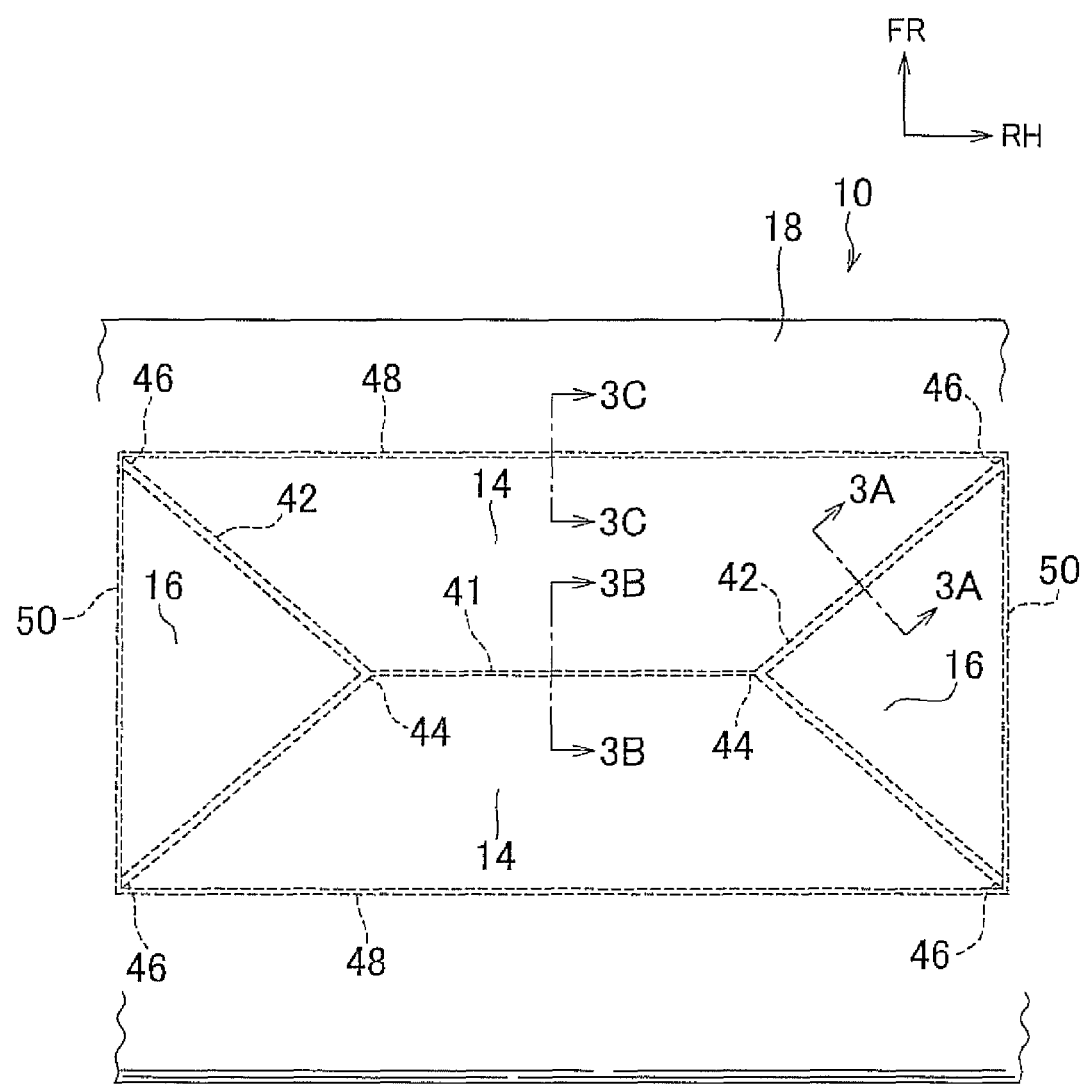

Referring to FIGS. 1, 2, and 4, the central doors 14 are provided at a central portion of the inflation opening 26A, through which the airbag 12 inflates from the module case 26, in the vehicle width direction. The central doors 14 are regions that open in the vehicle longitudinal direction due to an inflation pressure of the airbag 12, and are designed as, for example, part of the dashboard 18. A pair of central doors 14 is provided in the vehicle longitudinal direction to open forward and backward with respect to the vehicle when the airbag 12 inflates to a certain extent. A first prearranged rupture portion 41, which ruptures due to the inflation pressure of the airbag 12, is provided between the pair of the central airbag doors 14. The first prearranged rupture portion 41 extends in, for example, the vehicle width direction. In addition, a width dimension of each of the central doors in the vehicle width direction is set larger than a width dimension of a head portion 24H of the passenger 24 (for example, a head portion 24H of the dummy 24 used at crush test) in the vehicle width direction.

Referring to FIGS. 1, 2, and 4, in the inflation opening 26A through which the airbag 12 inflates from the module case 26, the lateral end doors 16 are provided adjacent to both the sides of the central doors 14 in the vehicle width direction. The lateral end doors 16 are portions that open in the vehicle width direction due to the inflation pressure of the airbag 12, and are designed as, for example, part of the dashboard 18. The lateral end doors 16 are set in the shape of, for example, a triangle, and are provided as a pair on both the sides of the central doors 14 in the vehicle width direction so as to open on both the sides in the vehicle width direction in the initial stages of inflation of the airbag 12. The central doors 14 and the lateral end doors 16 are provided in corresponding areas of the rectangular inflation opening 26A respectively. Therefore, in the case where the lateral end doors 16 are set in the shape of a triangle, the central airbag doors 14 assume the shape of a trapezoid.

Referring to FIG. 4, the positions of the lateral end doors 16 in the dashboard 18 are set at the regions of the dashboard 18 in the vehicle width direction, for example, on either side of a head portion 24H of the passenger 24 that is restrained by the airbag 12. This setting is intended to suppress the lateral end doors 16 from interfering with the head portion 24H during deployment of the lateral end doors 16. In addition, FIG. 4 shows a particular situation, for example, the head portion 24H of the passenger 24 is very close to the airbag doors. However, it is not necessarily the case that the head portion 24H comes close to the airbag doors as shown FIG. 4.

Second prearranged rupture portions 42, which are more fragile than the first prearranged rupture portion 41, are provided at border portions between the pair of the central doors 14 and the pair of the lateral end doors 16, and the second prearranged rupture portions 42 ruptures due to the inflation pressure of the airbag 12. The second prearranged rupture portions 42 are formed in the shape of V so as to bifurcate from both ends 44, in the vehicle width direction, of the first prearranged rupture portion 41, extend forward and backward with respect to the vehicle respectively, and terminate at ends 46 corresponding to four corners of the module case 26 respectively.

Figure 3A:
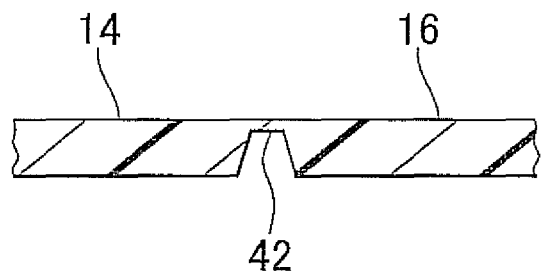
FIG. 3A is an enlarged sectional view showing one of the second prearranged rupture portions as viewed in a direction indicated by arrows 3A-3A of FIG. 2.
Figure 3B:
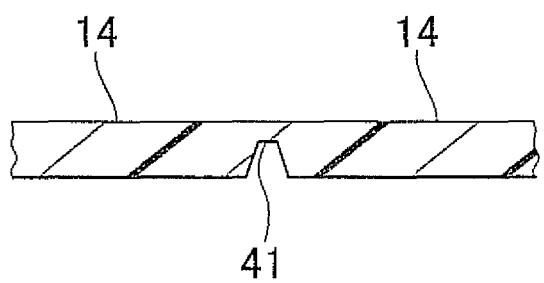
FIG. 3B is an enlarged sectional view showing the first prearranged rupture portion as viewed in a direction indicated by arrows 3B-3B of FIG. 2.

The first prearranged rupture portion 41 and the second prearranged rupture portions 42 are fragile portions constructed thinly by, for example, providing continuous grooves or discontinuous grooves on the reverse face of the dashboard 18. As shown in FIG. 3A, the thickness of the second prearranged rupture portions 42 is set smaller than that of the first prearranged rupture portion 41 (FIG. 3B). Thus, the second prearranged rupture portions 42 are designed to be more fragile than the first prearranged rupture portion 41.

The dashboard 18 is provided with hinge portions 48 that extend to couple the ends 46 of the second prearranged rupture portions 42 in the vehicle width direction to serve as deployment centers of the pair of the central airbag doors 14 respectively. The hinge portion 48 located on the front side with respect to the vehicle is provided along the front longitudinal wall portion 26F of the module case 26, and the hinge portion 48 located on the rear side with respect to the vehicle is provided along the rear longitudinal wall portion 26B of the module case 26.

Further, the dashboard 18 is provided with hinge portions 50 that extend so as to couple, for example, the ends 46 of the second prearranged rupture portions 42 in the vehicle longitudinal direction to serve as deployment centers of the lateral end doors 16 respectively. The hinge portion 50 located on the right side with respect to the vehicle is provided along the right longitudinal wall portion 26R of the module case 26, and the hinge portion 50 located on the left side with respect to the vehicle is provided along the left longitudinal wall portion 26L of the module case 26.

Figure 3C:
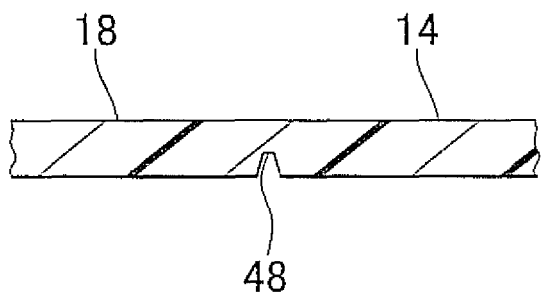
FIG. 3C is an enlarged sectional view showing one of hinge portions as viewed in a direction indicated by arrows 3C-3C of FIG. 2.

The hinge portions 48 and 50 are, for example, integrally provided in the dashboard 18. As shown in FIG. 3C, for example, the thickness of the hinge portions 48 is greater than that of the first prearranged rupture portion 41 (FIG. 3A) or that of the second prearranged rupture portions 42 (FIG. 3B) so that the hinge portions 48 are not ruptured during inflation of the airbag 12. The same holds true for the hinge portions 50.

Referring to FIG. 4, the dashboard 18 may be covered with a skin (not shown). In this case, it is desirable to provide prearranged rupture portions (not shown) at positions facing the first prearranged rupture portion 41 and the second prearranged rupture portions 42 respectively so that the skin is smoothly torn open along with the central airbag doors 14 and the lateral airbag doors 16 when the airbag 12 is deployed.

Next, the operation of the first embodiment of the invention will be described. Referring to FIG. 4, in the front passenger airbag device 10 according to the first embodiment of the invention, when a head-on collision of the vehicle 28 (FIG. 1) occurs and the airbag ECU determines that the collision has occurred based on a signal from the collision sensor (not shown), an actuation current is caused to flow from the airbag ECU to the inflator 30. Upon receiving the actuation current, the inflator 30 is actuated to expel a large amount of the gas through the gas spurt holes 30B of the gas injection portion 30A. In response to the injection of gas into the airbag 12, the airbag 12 begins to inflate.

Figure 6A:
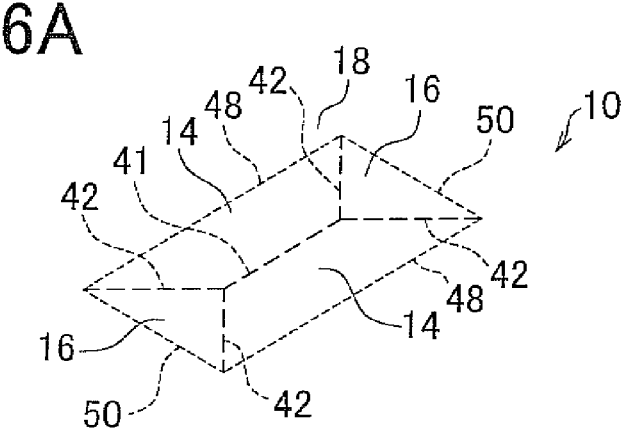
FIG. 6A is one of a series of views showing the inflation process of the airbag, more specifically, a perspective view showing the central doors, the lateral end doors, the first prearranged rupture portion, and the second prearranged rupture portions before initial inflation ports open.

It should be noted herein that both lateral ends 12A of the airbag 12 are folded in the vehicle width direction after being folded in the vehicle longitudinal direction. Therefore, when inflated with the gas, the lateral ends 12A of the airbag 12 are the first to expand. The lateral ends 12A of the airbag 12 are arranged to face the respective lateral end doors 16. Therefore, the inflation pressure of the airbag 12 in the initial stages of inflation is concentrated on the lateral end doors 16. Thus, as shown in FIGS. 6A and 6B, the second prearranged rupture portions 42, which are provided between the pair of the central doors 14 and the lateral end doors 16 on both the sides respectively, are ruptured, and the lateral end doors 16 open.

More specifically, the second prearranged rupture portions 42 are formed in the shape of V so as to branch off from both the ends 44 of the first prearranged rupture portion 41, and extend forward and backward with respect to the vehicle respectively. Therefore, the triangular lateral end doors 16, which are sandwiched between the second prearranged rupture portions 42 and the hinge portions 50 respectively, open to the sides in the vehicle width direction around the respective hinge portion 50. That is, the lateral end door 16 on the right side of the vehicle opens around the hinge portion 50 to the right side, and the lateral end door 16 on the left side of the vehicle opens around the hinge portion 50 to the left side.

The second prearranged rupture portions 42, as shown in FIGS. 3A and 3B, are more fragile than the first prearranged rupture portion 41, and hence are likely to be ruptured when the inflation pressure of the airbag 12 acts thereon. Thus, in the initial stages of inflation of the airbag 12, the central doors 14 are suppressed from opening to promote the opening of the lateral end doors 16.

Figure 6B:
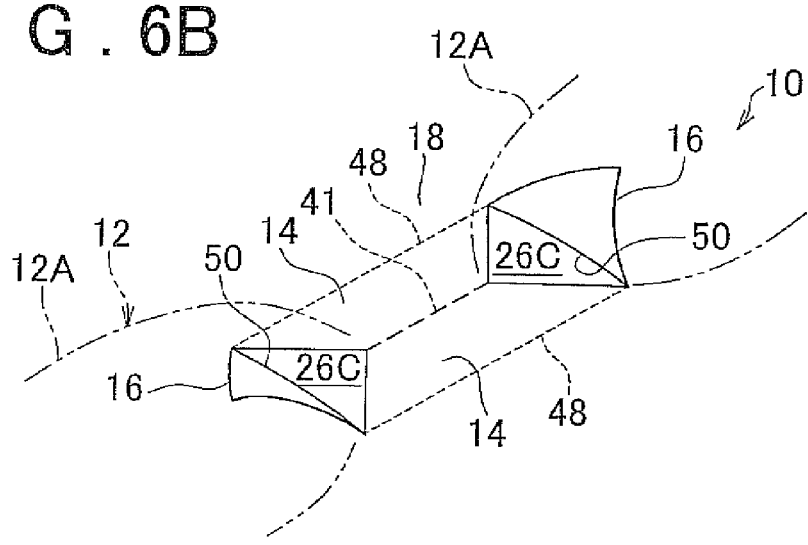
FIG. 6B shows the inflation process of the airbag, more specifically, a perspective view showing the second prearranged rupture portions after being ruptured, the lateral end doors have opened on both the sides of the airbag door in the vehicle width direction respectively, and both the lateral ends of the airbag in the vehicle width direction have inflated through the initial inflation ports respectively.
Figure 6C:
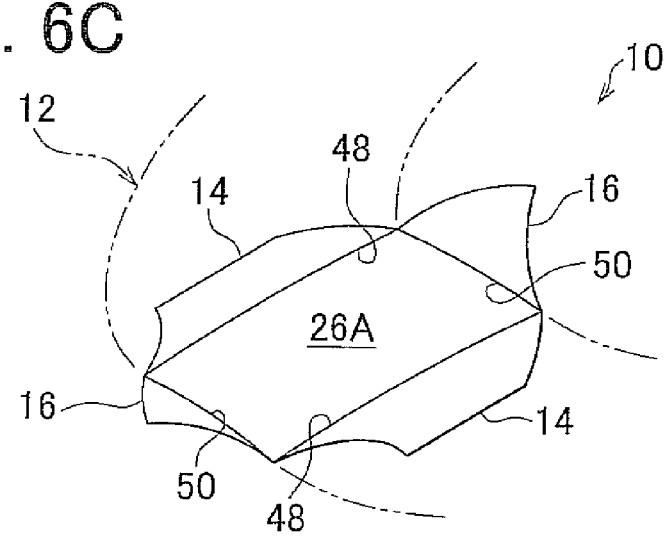
FIG. 6C shows the inflation process of the airbag, more specifically, a perspective view showing the first prearranged rupture portion has been ruptured, the central airbag doors have opened, and hence the airbag has fully deployed.

Thus, as shown in FIGS. 6B and 6C, the lateral end doors 16 open before the central doors 14, and the triangular initial inflation ports 26C are formed respectively on both the sides in the vehicle width direction. As shown in FIGS. 6B and 7, the airbag 12 begins to inflate toward the front seat passenger 24 from within the module case 26 through the initial inflation ports 26C. Thus, the areas of the airbag 12 that correspond to the central doors 14 can be suppressed from opening during the initial stages of inflation of the airbag 12. Even if the front seat passenger 24 is near the dashboard 18, the reactive force of the airbag 12 for the front seat passenger 24 can be suppressed in the initial stage of inflation of the airbag, and the airbag 12 can restrain the front seat passenger 24 appropriately.

As shown in FIG. 6C, upon further inflation of the airbag 12, the inflation pressure thereof acts on the pair of central doors 14, and thus causes the first prearranged rupture portion 41 to rupture. The first prearranged rupture portion 41 extends in the vehicle width direction. Therefore, the front central airbag door 14 opens forward around the front hinge portion 48, and the rear central airbag door 14 opens backward around the rear hinge portion 48. In this manner, the pair of the central doors 14 open forward and backward respectively, and the inflation opening 26A thereby opens completely. Therefore, the airbag 12 can inflate and deploy (fully deploy) into its original size. Thus, when the front seat passenger 24 is sufficiently away the dashboard 18 when a head-on collision of the vehicle 28 occurs, a sufficient reactive force of the airbag 12 to appropriately restrain the front seat passenger 24 is ensured.

Next, modified examples of the first embodiment of the invention will be described. The central doors 14 and the lateral end doors 16 are not limited to the configuration described above, but may adopt constructions shown in, for example, FIGS. 8 and 9. In the modified example shown in FIG. 8A, the pair of the central doors 14 and the lateral end doors 16 are all formed in a rectangular shape, and the length of the central doors 14 in the vehicle width direction is set shorter than in the example of FIG. 6A. The modified example is similar to the example of FIG. 6 in that the second prearranged rupture portions 42 are so formed as to branch off forward and backward with respect to the vehicle from both the ends 44 of the first prearranged rupture portion 41 in the vehicle width direction respectively. In this modified example, however, the second prearranged rupture portions 42 are formed as lines extending in the vehicle longitudinal direction through both the ends 44 of the first prearranged rupture portion 41 in the vehicle width direction respectively. The lateral end doors 16 are provided, at edges located on the front side with respect to the vehicle and on the rear side with respect to the vehicle, with third prearranged rupture portions 43 extending outward in the vehicle width direction from the ends 46 of the second prearranged rupture portions 42 respectively. The thickness of the third prearranged rupture portions 43 is set equal to the thickness of the second prearranged rupture portions 42 (a rupture strength of each of the second prearranged rupture portions 42 is set substantially equal to a rupture strength of each of the third prearranged rupture portions 43). That is, the thickness of the third prearranged rupture portions 43 is set smaller than the thickness of the first prearranged rupture portion 41, and the second prearranged rupture portions 42 and the third prearranged rupture portions are thereby designed to be more fragile than the first prearranged rupture portion 41.

Figure 8A:
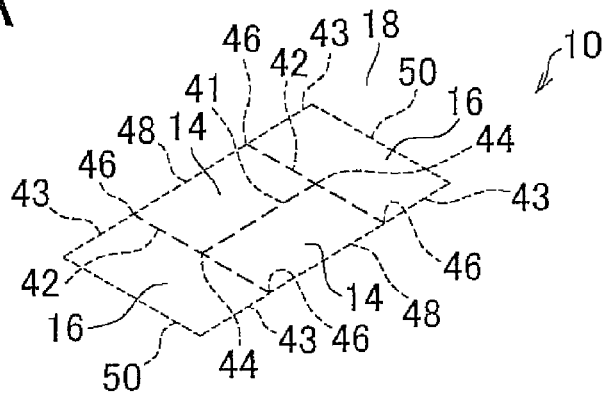
FIG. 8A is one of a series of views showing an inflation process of an airbag according to a modified example of the invention, more specifically, a perspective view showing central doors, lateral end doors, a first prearranged rupture portion, and second prearranged rupture portions before rectangular initial inflation ports open.
Figure 8B:
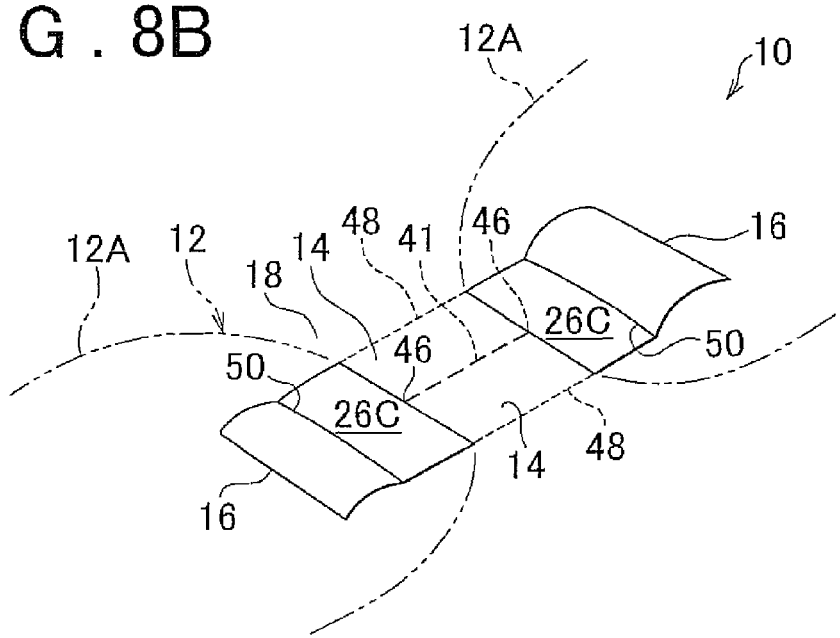
FIG. 8B shows the inflation of the airbag according to the modified example of the invention, more specifically, a perspective view showing the second prearranged rupture portions have been ruptured, the lateral end doors on both the sides of the airbag door have opened in the vehicle width direction respectively, and both lateral ends of the airbag in the vehicle width direction have inflated through rectangular initial inflation ports respectively.

In this example, as shown in FIG. 8B, the second prearranged rupture portions 42 and the third prearranged rupture portions 43 are ruptured in the initial stages of inflation of the airbag 12, and the lateral end doors 16 on both the sides thereby open outward in the vehicle width direction around the hinge portions 50 respectively. As a result, the rectangular initial inflation ports 26C are formed on both the sides in the vehicle width direction respectively. The area of these initial inflation ports 26C is larger than that of the triangular initial inflation ports 26C shown in FIG. 6B. Accordingly, the airbag 12 can smoothly inflate outward in the vehicle width direction (see FIG. 7) from inside the module case 26 through these rectangular initial inflation ports 26C.

Figure 8C:
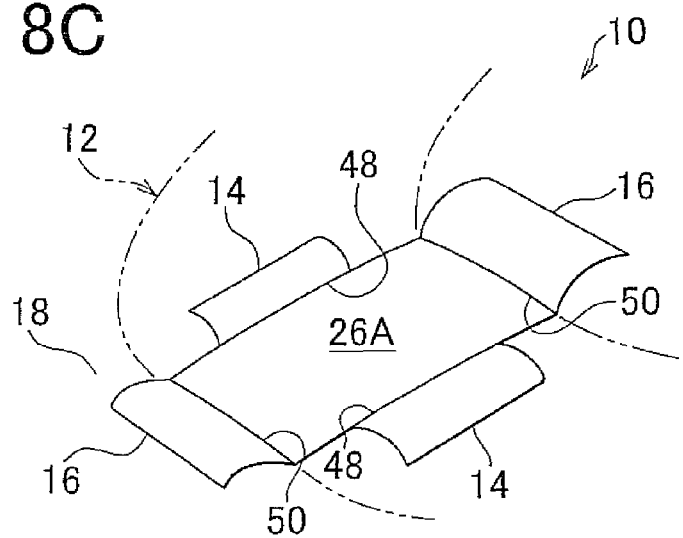
FIG. 8C shows the inflation process of the airbag according to the modified example of the invention, more specifically, a perspective view showing the first prearranged rupture portion has been ruptured, the central doors have opened, and hence the airbag has fully deployed.

As shown in FIG. 8C, when the airbag 12 further inflates and the inflation pressure thereof acts on the pair of the central doors 14, the first prearranged rupture portion 41 is ruptured. Then, the central door 14 located on the front side opens forward around the hinge portion 48 located on the front side, and the central door 14 located on the rear side opens backward around the hinge portion 48 located on the rear side. In this manner, the pair of the central doors 14 open forward and backward with respect to the vehicle respectively, and the inflation opening 26A thereby opens completely. Therefore, the airbag 12 can deploy into its original size.

Figure 9A:
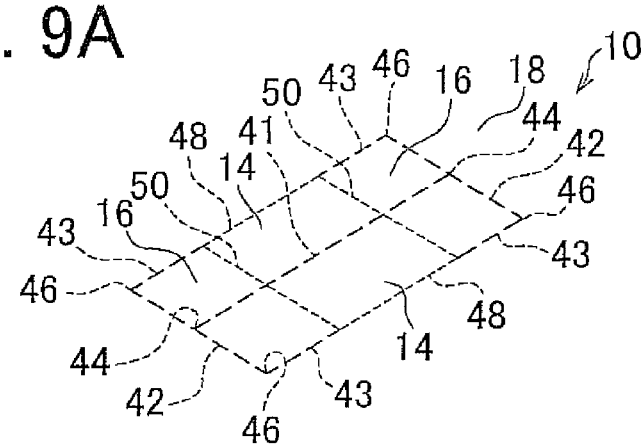
FIG. 9A is one of a series of views showing an inflation process of an airbag according to another modified example of the invention, more specifically, a perspective view showing central doors, lateral end doors, a first prearranged rupture portion, and second prearranged rupture portions before rectangular initial inflation ports open.

Further, in the other modified example of the first embodiment of the invention shown in FIG. 9A, the central doors 14 and the lateral end doors 16 assume the same shape as in the example shown in FIG. 8A, but the positions of the second prearranged rupture portions 42 and the positions of the hinge portions 50 reverse the order, and the first prearranged rupture portion 41 is extended on both the sides in the vehicle width direction to the outer edges of the lateral end doors 16 (the second prearranged rupture portions 42). That is, both ends 44 of the first prearranged rupture portion 41 terminate at positions that intersect with the second prearranged rupture portions 42. The second prearranged rupture portions 42 branch off in the vehicle longitudinal direction from both ends 44 of the first prearranged rupture portion 41, and are substantially linear in the vehicle longitudinal direction. The third prearranged rupture portions 43 are provided at the front and rear of the end edge of the lateral end doors 16 and extend from the ends 46 of the second prearranged rupture portions 42 toward the central doors 14 respectively. The hinge portions 50 are provided at the border between the central doors 14 and the lateral end doors 16. The thickness of the third prearranged rupture portions 43 is set equal to the thickness of the second prearranged rupture portions 42 (a rupture strength of each of the second prearranged rupture portions 42 is set substantially equal to a rupture strength of each of the third prearranged rupture portions 43).

Figure 9B:
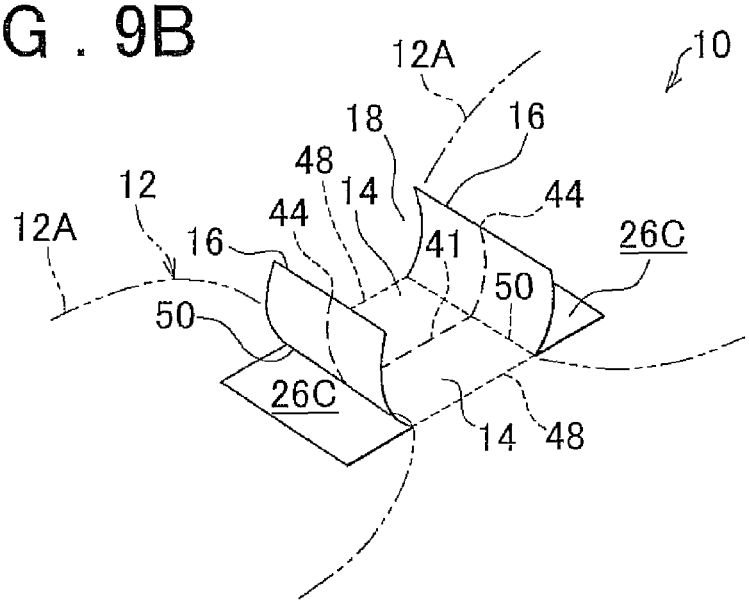
FIG. 9B shows the inflation process of the airbag according to the modified example of the invention, more specifically, a perspective view showing the second prearranged rupture portions have been ruptured, the lateral end doors have opened inward in the vehicle width direction respectively, and both lateral ends of the airbag in the vehicle width direction have inflated through rectangular initial inflation ports respectively.

In this example, as shown in FIG. 9B, the second prearranged rupture portions 42 and the third prearranged rupture portions 43 are ruptured in the initial stages of inflation of the airbag 12, and the lateral end doors 16 thereby open inward in the vehicle width direction around the hinge portions 50. As a result, the rectangular initial inflation ports 26C are formed on each side in the vehicle width direction. As is the case with the example shown in FIG. 8B, the initial inflation ports 26C are larger in area than the triangular initial inflation ports 26C shown in FIG. 6B. The lateral end doors 16 open inward in the vehicle width direction. Therefore, both the lateral ends 12A of the airbag 12 are likely to inflate outward in the vehicle width direction. Accordingly, the airbag 12 can more smoothly inflate from inside the module case 26 outward in the vehicle width direction (see FIG. 7) through these rectangular initial inflation ports 26C in the initial stages of inflation.

Figure 9C:
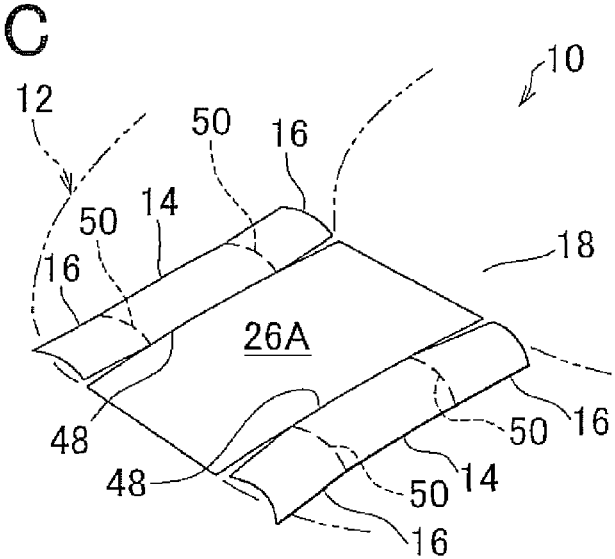
FIG. 9C shows the inflation process of the airbag according to the modified example of the invention, more specifically, a perspective view showing the first prearranged rupture portion has been ruptured, the central doors have deployed, and hence the airbag has fully deployed.

As shown in FIG. 9C, when the airbag 12 further inflates and the inflation pressure thereof acts on the pair of the central doors 14, the first prearranged rupture portion 41, which is provided from the central doors 14 to the lateral end doors 16, is ruptured. As a result, the central door 14 located on the front side and the lateral end doors 16 located on the front side open forward around the front hinge portion 48, and the central door 14 located on the rear side and the lateral end doors 16 located on the rear side open backward around the rear hinge portion 48. Then, the lateral end doors 16 on each side are separated from each other in the vehicle longitudinal direction along the first prearranged rupture portion 41. In this manner, the pair of the central doors 14 and the lateral end doors 16 open forward and backward, and the inflation opening 26A is thereby completely opened. Therefore, the airbag 12 can deploy into its original size.

Figure 10:
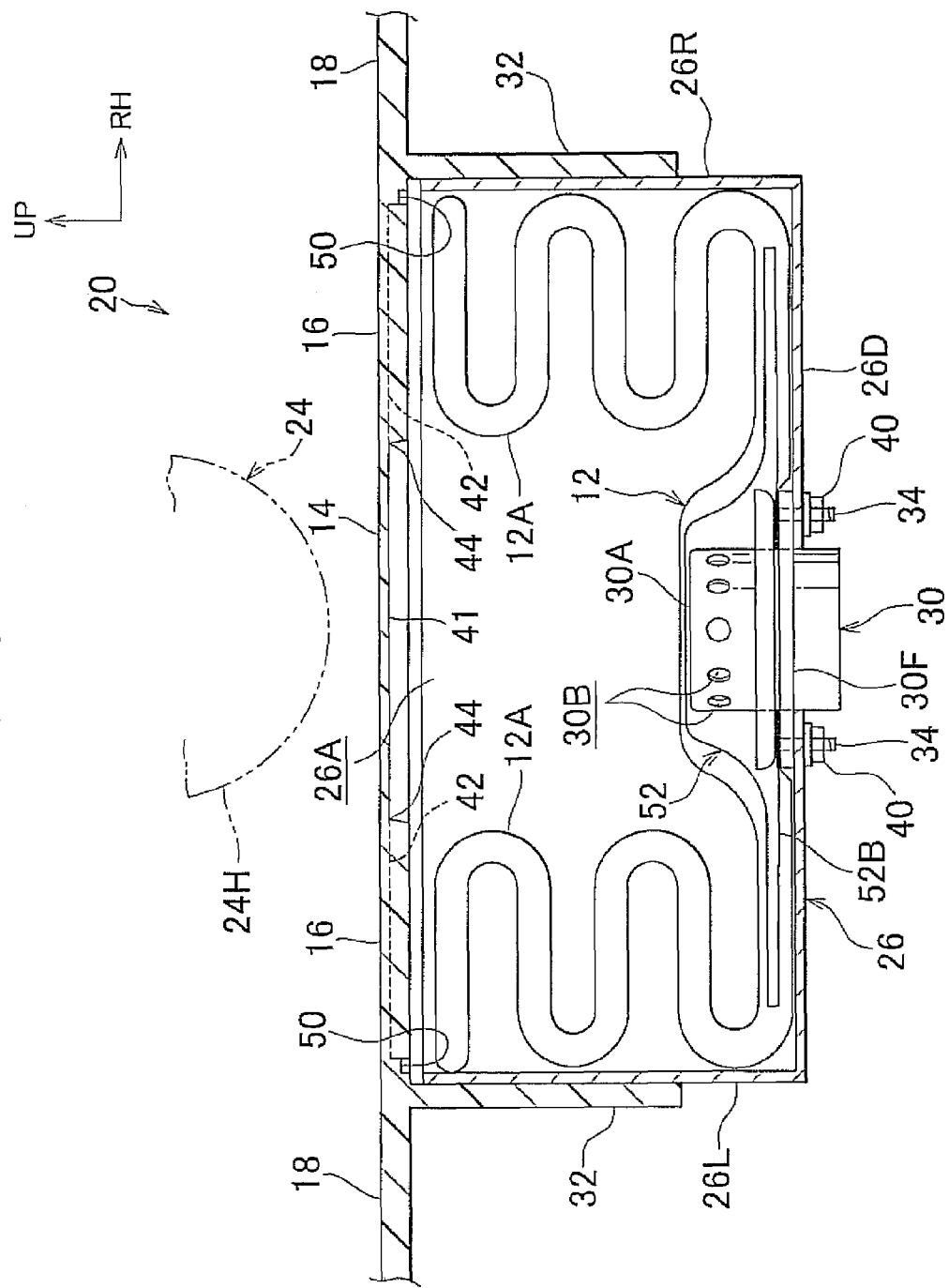
Figure 11:
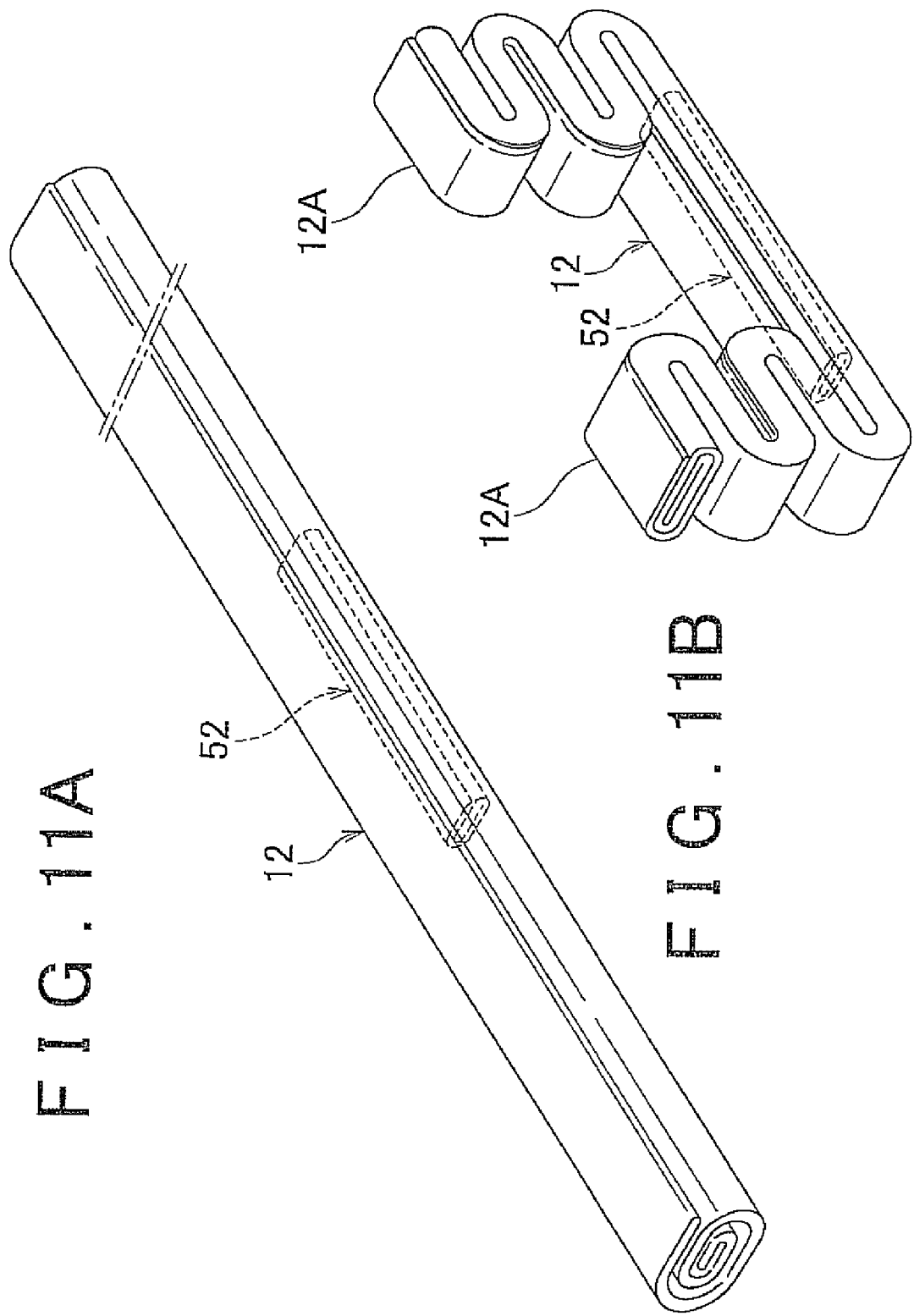

Referring to FIG. 10, in an front passenger airbag device 20 according to the second embodiment of the invention, the airbag 12 includes an inner bag 52 that distributes the gas from the inflator 30 to the lateral ends of the airbag 12. As shown in FIGS. 11A and 11B, the inner bag 52 is folded and arranged below the airbag 12, on the lower wall portion 26D. Further, as shown in FIG. 10, the inner bag 52 has a bottom-side base fabric 52B as a bottom face sandwiched between the mounting flange 30F of the inflator 30 and the retainer 32. The gas injection portion 30A of the inflator 30 is arranged in the inner bag 52.

As shown in FIGS. 12, 13C, 13D, and 14, in a deployment state, gas discharge ports 52A that open toward the lateral end doors 16 on both the sides respectively is provided in the inner bag 52. An upper face 52C of a central portion of the inner bag 52 in the vehicle width direction is so set as not to stick out from, for example, the module case 26 so that no unwanted pressure from the inside acts from the upper face 52C on the central doors 14 during deployment of the inner bag 52. In this embodiment of the invention, the gas discharge ports 52A are provided respectively at tips of tube portions 52D protruding outward from the upper face 52C of the inner bag 52.

The second embodiment of the invention is otherwise identical in other details to the first embodiment of the invention. Therefore, the components of the second embodiment of the invention that are identical to those of the first embodiment of the invention are denoted by the same reference symbols respectively in the drawings and will not be described any further.

The operation of the second embodiment of the invention described above will be described below. Referring to FIG. 10, in the front passenger airbag device 20 for the according to this embodiment of the invention, the gas supplied from the inflator 30 is distributed to the lateral ends 12A of the airbag 12 through the inner bag 52 during the initial stages of inflation of the airbag 12.

Figure 12:
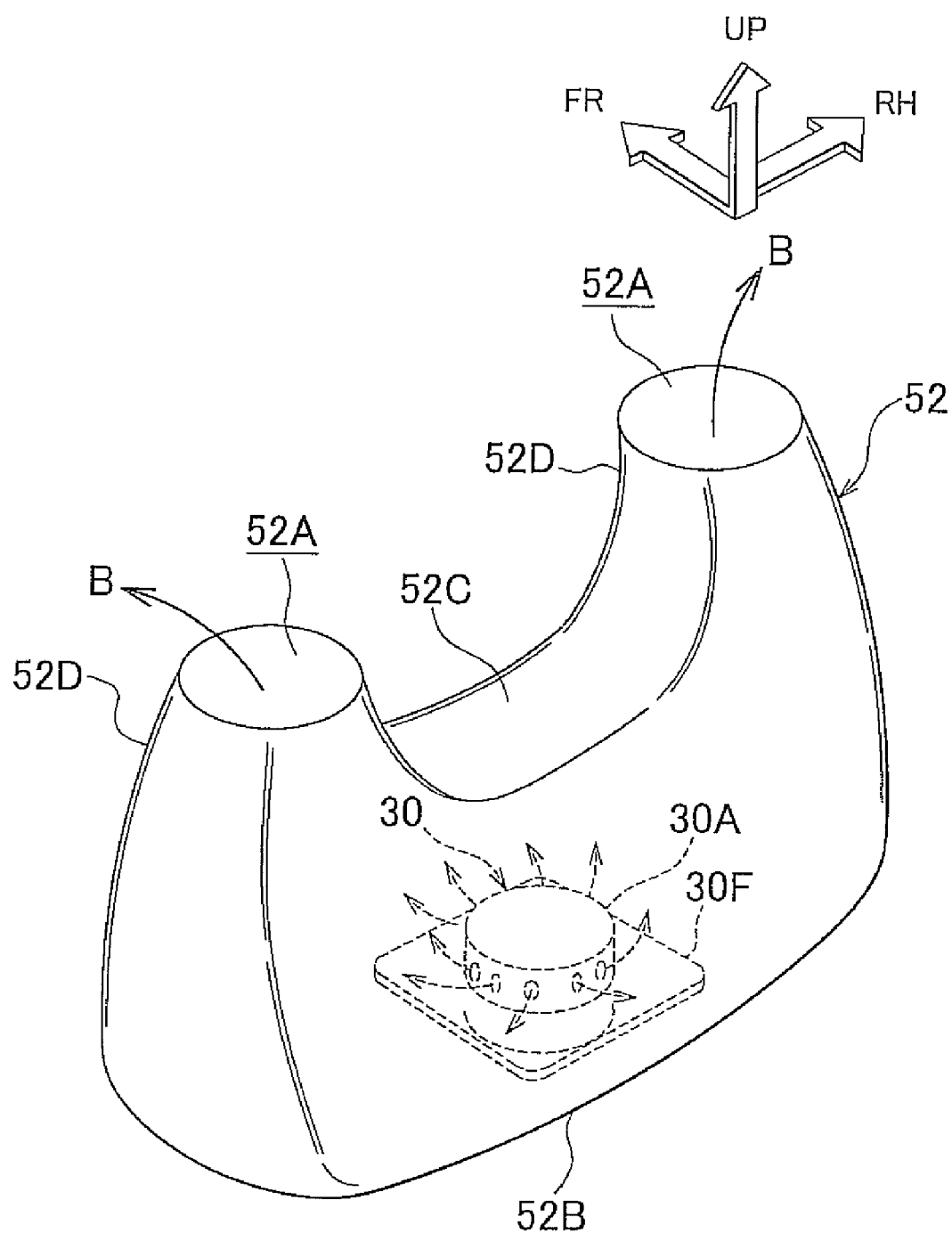
Figure 13A:
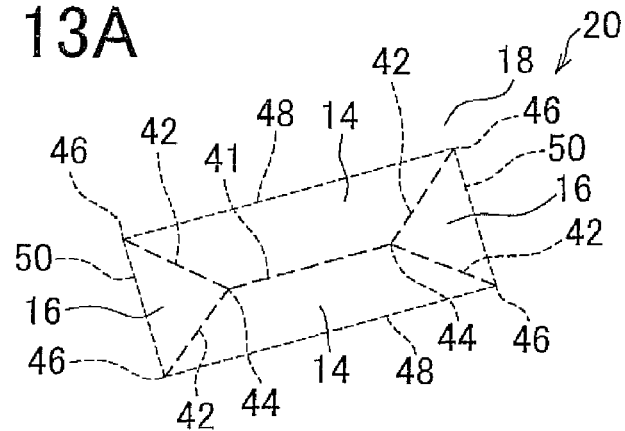
FIG. 13A is one of a series of views showing an inflation process of the airbag, more specifically, a perspective view showing central doors, lateral end doors, a first prearranged rupture portion, and second prearranged rupture portions before triangular initial inflation ports open.
Figure 13B:
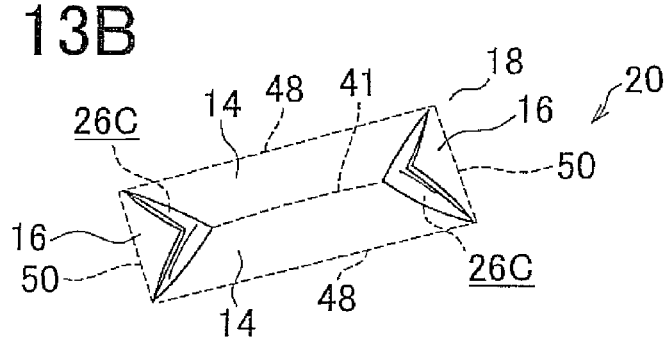
FIG. 13B shows the inflation process of the airbag, more specifically, a perspective view showing the second prearranged rupture portions have been ruptured.
Figure 13C:
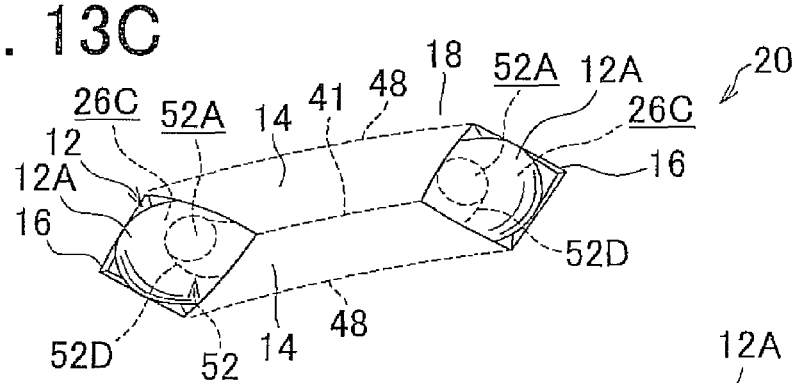
FIG. 13C shows the inflation process of the airbag, more specifically, a perspective view showing the lateral end doors have opened and both the lateral ends of the airbag in the vehicle width direction have begun to inflate from the triangular initial inflation ports respectively.
Figure 13D:
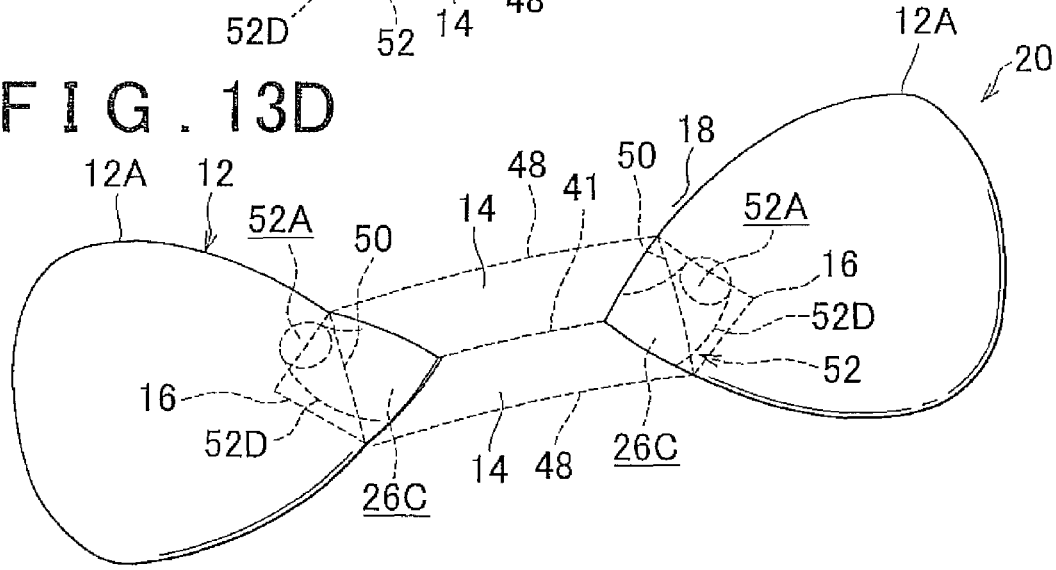
FIG. 13D shows the inflation process of the airbag, more specifically, a perspective view showing both the lateral ends of the airbag in the vehicle width direction have further inflated.
Figure 14:
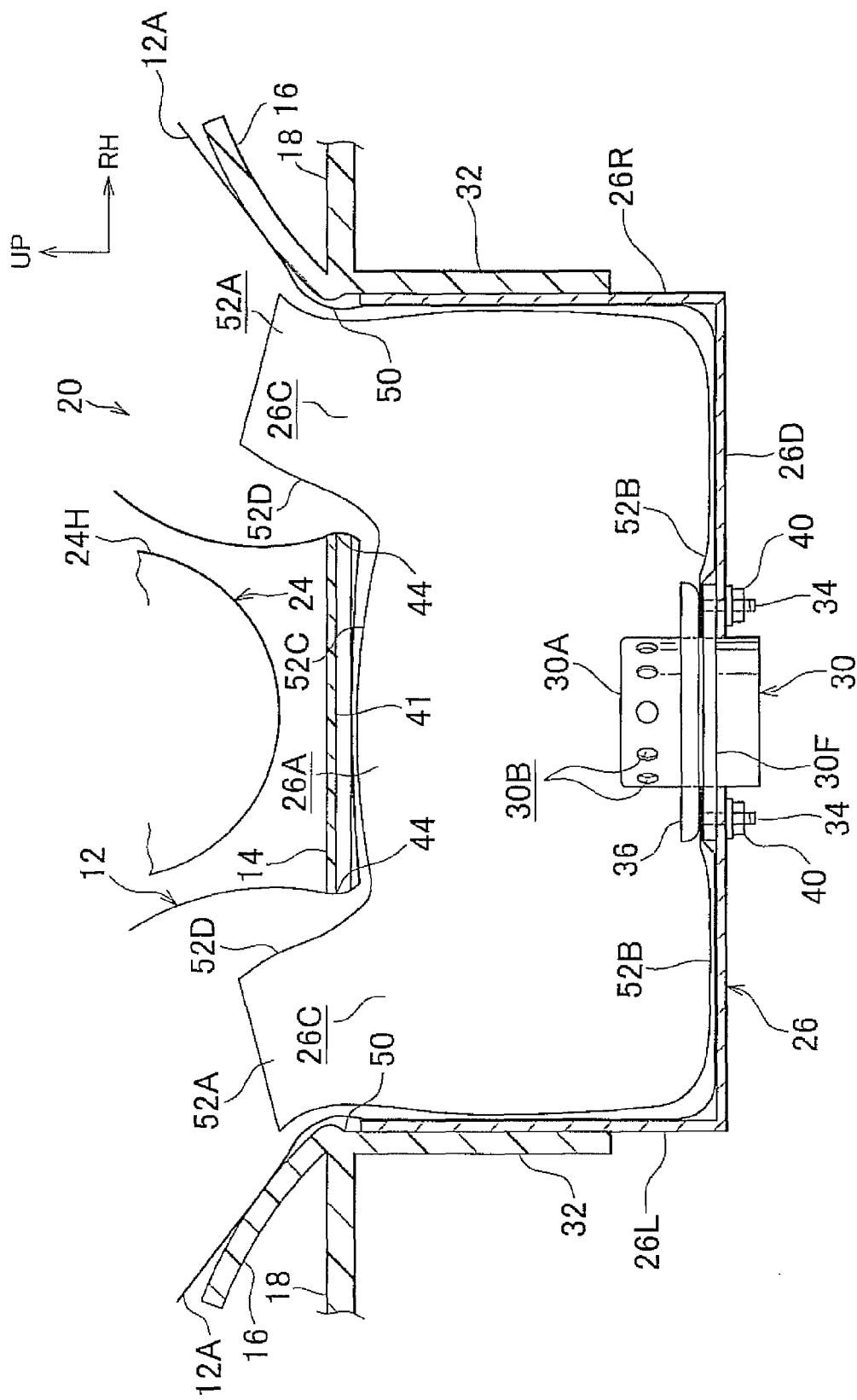

More specifically, as shown in FIGS. 12 and 14, the gas injected through the gas injection portion 30A of the inflator 30 is first supplied into the inner bag 52. Due to the pressure of the injected gas, the inner bag 52 and the airbag 12 begin to inflate. The gas injected into the inner bag 52 is then distributed to the tube portions 52D, and is discharged in the directions indicated by arrows B from the gas discharge ports 52A at the tips of the tube portions 52D, and is supplied into the airbag 12.

These gas discharge ports 52A face the respective lateral end doors 16 on each side. Therefore, the inflation pressure of the airbag 12 is concentrated on the lateral end doors 16, which are located on both the sides of the inflation opening 26A of the airbag 12. Further, the upper face 52C of the inner bag 52 is so set as not to abut on the central doors 14 in a deployment state of the inner bag 52. That is, in the deployment state of the inner bag 52, the distance between the upper face 52C of the inner bag 52 and the bottom-side base fabric 52B (the bottom face) of the inner bag 52 is smaller than the distance between the inner faces of the central doors 14 and the bottom-side base fabric 52B (the bottom face) of the inner bag 52. Therefore, an unwanted pressure from the inside is suppressed from acting from the upper face 52C on the central doors 14 during deployment of the inner bag 52.

Thus, as shown in FIGS. 13A to 13D, the second prearranged rupture portions 42 are ruptured, the lateral end doors 16 open before the central doors 14, and the initial inflation ports 26C are formed on each side in the vehicle width direction. The airbag 12 begins to inflate from within the module case 26 outward in the vehicle width direction through the initial inflation ports 26C. When the airbag 12 inflates from the rear longitudinal wall portion 26B, the tube portions 52D of the inner bag 52 also extend from the respective initial inflation ports 26C as shown in FIG. 14.

Thus, in the initial stages of inflation of the airbag 12, expansion of the area of the airbag 12 corresponding to the central doors 14 is restrained, instead the gas is supplied to both lateral ends 12A of the airbag 12 in the vehicle width direction. Accordingly, even if the front seat passenger 24 is near the dashboard 18, a sufficient reactive force of the airbag 12 to appropriately restrain the front seat passenger 24 is ensured.

Although not shown in the drawings, when the airbag 12 further inflates and the inner pressure of the airbag 12 increases, the gas in the airbag 12 flows from both the lateral ends 12A of the airbag 12 into spaces between the upper face 52C of the inner bag 52 and the central doors 14 respectively as well, and the inflation pressure of the airbag 12 acts on the pair of the central doors 14. As a result, the first prearranged rupture portion 41 is ruptured.

Thus, the pair of the central doors 14 open forward and backward respectively, and the inflation opening 26A is thereby opened completely. Therefore, the airbag 12 can deploy into its original size. Thus, when the front seat passenger 24 is sufficiently far from the dashboard 18 when a head-on collision of the vehicle 28 occurs, a sufficient reactive force of the airbag 12 to appropriately restrain the front seat passenger 24 is ensured.

In a modified example of the second embodiment of the invention shown in FIG. 15, the airbag 12 is designed as a so-called twin chamber airbag having a right expansion portion 12R and a left expansion portion 12L. The inner bag 52 is provided within the airbag 12. Therefore, the gas may be efficiently supplied to the right expansion portion 12R and the left expansion portion 12L from the gas discharge ports 52A of the inner bag 52 on each side during inflation of the airbag 12. Further, by designing the airbag 12 as the twin chamber airbag, the passenger 24 can be more stably retrained by a recess 12B formed between the right expansion portion 12R and the left expansion portion 12L.

In the example shown in FIG. 14, the tube portions 52D of the inner bag 52 extend from the initial inflation ports 26C respectively. However, the invention is not limited to this configuration. The length of the tube portions 52D may be shortened so that the tube portions 52D remain within the module case 26.

In the examples of the respective embodiments, the airbag doors are provided in the upper surface of the dashboard 18. However, the invention is not limited to this configuration. The airbag doors may be provided in the middle portion of the dashboard 18 in the vertical direction of the vehicle.

What is claimed is:

1. A front passenger airbag device comprising:
   an airbag that is folded and accommodated in an accommodation portion provided in a dashboard and in front of a front seat passenger, the dashboard having an exterior surface, wherein the airbag deploys toward the front seat passenger when inflated with a gas if a head-on collision of a vehicle occurs;
   an airbag door that is provided in the dashboard, and that opens when the airbag is deployed from the accommodation portion toward the front seat passenger, the airbag door includes a central door provided at a central portion of the airbag door in a vehicle width direction, and lateral end doors provided adjacent to both sides of the central door respectively; and
   an inner bag provided within the airbag that distributes the gas to both sides of the airbag in the vehicle width direction, the inner bag includes an upper face located at a central portion of the inner bag in the vehicle width direction, a tube portion that protrudes upwardly from each end of the upper face, and a gas discharge port formed at a tip of each of the tube portions, the gas discharge ports face the lateral end doors respectively;
   wherein the central door opens in the vehicle longitudinal direction due to an inflation pressure of the airbag, and the lateral end doors open in the vehicle width direction due to the inflation pressure of the airbag, and
   the inflation pressure of the airbag acts on the lateral end doors during an initial stage of an inflation of the airbag and wherein the upper face of the inner bag does not extend beyond the exterior surface of the dashboard when the inner bag is deployed.

2. The front passenger airbag device according to claim 1, wherein both lateral ends, in the vehicle width direction, of the airbag are folded in the vehicle width direction after being folded in the vehicle longitudinal direction, and
   the lateral ends of the airbag are arranged to face the lateral end doors respectively.

3. The front passenger airbag device according to claim 1, wherein
   the lateral end doors are provided at regions of the dashboard on either side of a head of the passenger in the vehicle width direction respectively.

4. The front passenger airbag device according to claim 3, wherein
   a width dimension of the central door in the vehicle width direction is set larger than a width dimension of the head of the passenger.

5. The front passenger airbag device according to claim 1, wherein
   the lateral end doors open before the central door opens, thereby forming initial inflation ports through which the airbag inflates, and
   the tube portions of the inner bag extend from the initial inflation ports respectively when the inner bag is deployed.

6. The front passenger airbag device according to claim 1, wherein
   the upper face of the inner bag and a bottom face of the inner bag are separated from each other by a distance that is shorter than the distance between an inner face of the central door and the bottom face of the inner bag.

7. The front passenger airbag device according to claim 1, wherein
   the central door is formed as a pair of central doors that open forward and backward with respect to the vehicle respectively,
   a first prearranged rupture portion that ruptures due to the inflation pressure of the airbag is provided at a border between the central doors, and
   second prearranged rupture portions that are more fragile than the first prearranged rupture portion and that rupture due to the inflation pressure of the airbag are provided respectively at borders between the central doors and the lateral end doors.

8. The front passenger airbag device according to claim 7, wherein
   the second prearranged rupture portions branch off from ends of the first prearranged rupture portion in the vehicle width direction, and extend forward and backward with respect to the vehicle respectively.

9. The front passenger airbag device according to claim 8, wherein
   the second prearranged rupture portions branch off from the ends of the first prearranged rupture portion in the vehicle width direction respectively, are substantially in a V shape.

10. The front passenger airbag device according to claim 9, wherein
    the lateral end doors are in a triangular shape.

11. The front passenger airbag device according to claim 8, wherein
    the second prearranged rupture portions are substantially linear and extend forward and backward from the ends of the first prearranged rupture portion,
    third prearranged rupture portions extending outward in the vehicle width direction from ends of the second prearranged rupture portions respectively are provided at an end edge thereof located on a front side with respect to the vehicle and an end edge thereof located on a rear side with respect to the vehicle, for each lateral end door, and
    a rupture strength of each of the second prearranged rupture portions is set substantially equal to a rupture strength of each of the third prearranged rupture portions.

12. The front passenger airbag device according to claim 11, wherein
    the lateral end doors are in a rectangular shape.

13. The front passenger airbag device according to claim 1, wherein
    the central door is formed as a pair of central doors that open forward and backward with respect to the vehicle respectively,
    a first prearranged rupture portion that ruptures due to the inflation pressure of the airbag is provided at a border between the central doors, extends in the vehicle width direction to respective outer edges of the respective lateral end doors,
    second prearranged rupture portions that are more fragile than the first prearranged rupture portion and rupture due to the inflation pressure of the airbag are formed in the airbag door, the second prearranged rupture portions are substantially linear and extend in the vehicle longitudinal direction from both ends of the first prearranged rupture portion, and third prearranged rupture portions extending from ends of the second prearranged portions toward the central doors respectively are provided at an end edge thereof located on a front side with respect to the vehicle and an end edge thereof located on a rear side with respect to the vehicle, for each lateral end door, a rupture strength of each of the second prearranged rupture portions is set substantially equal to a rupture strength of each of the third prearranged rupture portions.

14. The front passenger airbag device according to claim 13, wherein the lateral end doors are in a rectangular shape.

* * * * *